UNITED STATES PATENT OFFICE.

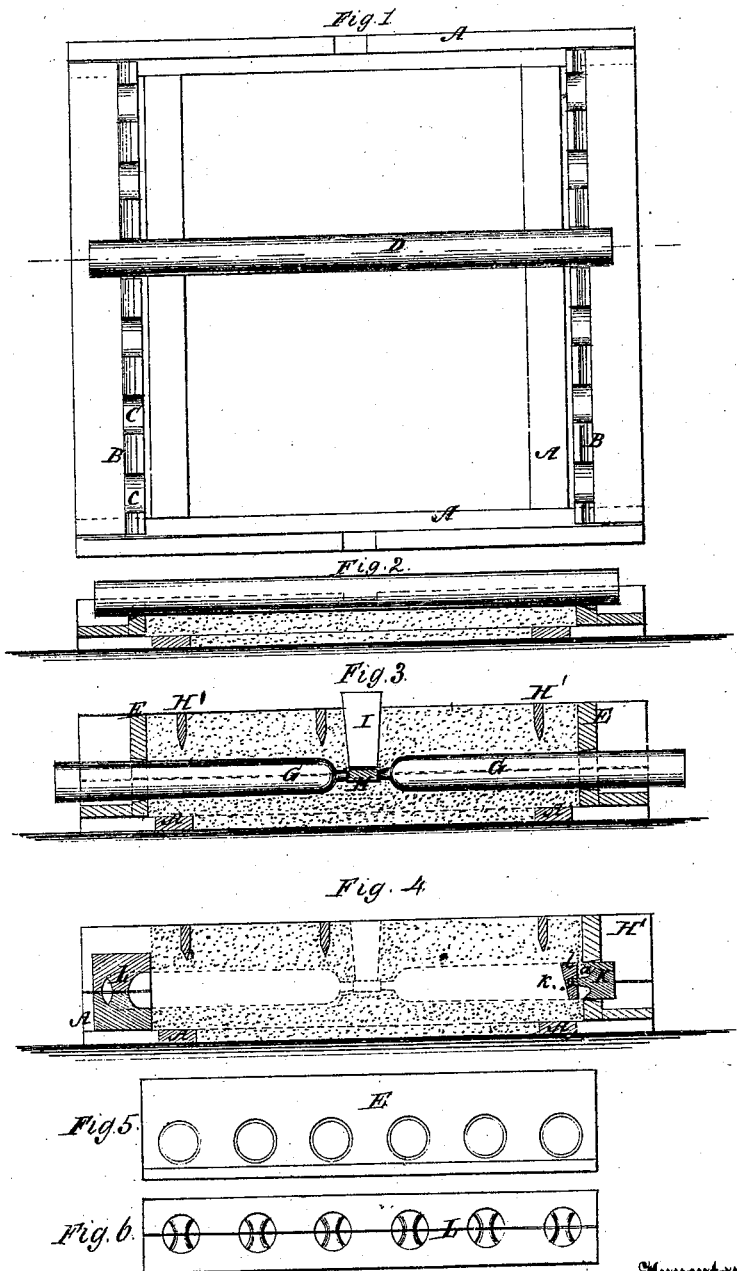
Ferguson & Anderson,
Molding Sash Weights.
No. 107,468.  Patented Sep. 20. 1870.

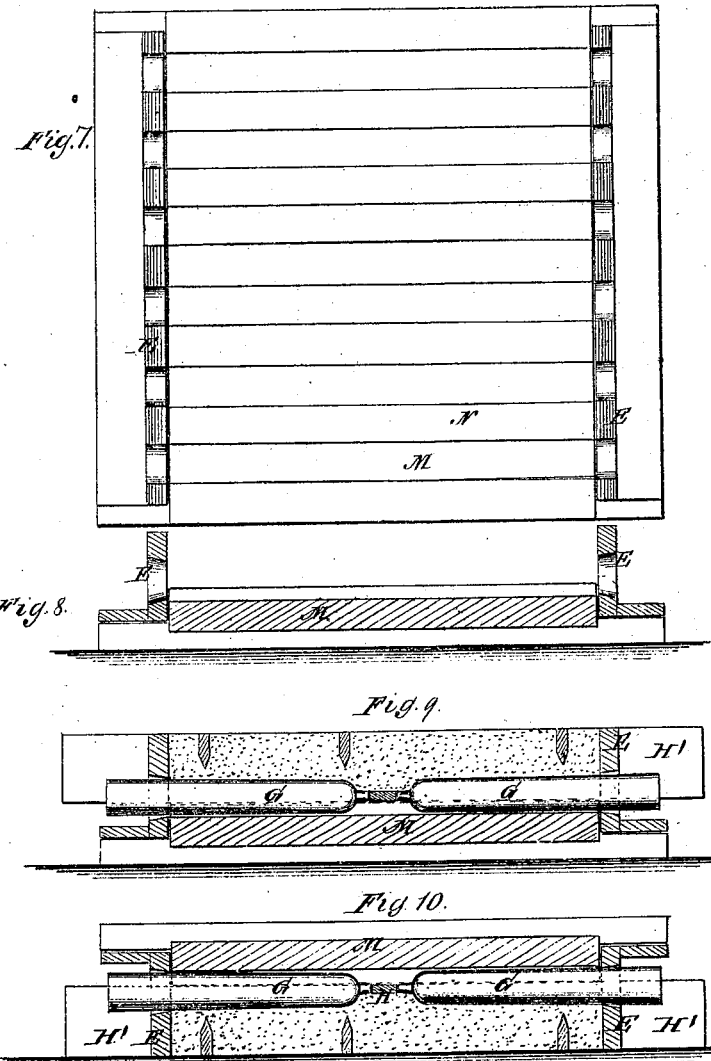

WILLIAM FERGUSON AND JAMES ANDERSON, OF NEW YORK, N. Y.

IMPROVEMENT IN MOLDING SASH-WEIGHTS.

Specification forming part of Letters Patent No. 107,468, dated September 20, 1870.

*To all whom it may concern:*

Be it known that we, WILLIAM FERGUSON and JAMES ANDERSON, both of New York city, in the county and State of New York, have invented certain new and useful Improvements in Molding Sash-Weights; and we do hereby declare that the following is a full, clear, and exact description thereof, which will enable others skilled in the art to make and use the same, reference being had to the accompanying drawings, forming a part of this specification.

This invention relates to improvements in molding sash-weights; and it consists in making the molds for the principal parts in sand, without partings, and arranging the molds so formed for the application of chills for making the holes in the ends for attaching the cords, and for smoothing the surfaces of the same to protect the cords.

Figure 1 is a plan view of the nowel previous to filling with sand. Fig. 2 is a transverse section of the same after being filled. Fig. 3 is a section of the same after the cope has been applied and packed with sand and before removal of the patterns. Fig. 4 is a section of the same after the patterns have been removed and the chills applied. Fig. 5 is a detail view of a part of the flask. Fig. 6 is a front elevation of one form of chills which we use for the ends of the weights to which the cords are attached. Fig. 7 is a plan view of a part of a flask, showing another way of carrying our invention into practice; and Figs. 8, 9, and 10 are sections of the same in different stages of the operation.

Similar letters of reference indicate corresponding parts.

A represents the bottom or nowel of a flask, which we place on the floor, or on a mold-board. It is preferably made wide enough for two rows of sash-weights, placed end to end; and the two side boards, B, which have concave recesses C in the top, are applied, so that they may be readily taken away when required. This nowel is filled with sand, level with the top. Then a round rod, D, of the same size as that which the weights are designed to be, and corresponding with the concave recesses, is employed to sink grooves in the sand extending across from one board, B, to the other, the said grooves being gaged by the recesses. Then the boards B are removed, and other boards, E, as high as the top of the cope is to be, and having holes in them of the size for the weights, and corresponding to the curved recesses, are substituted for them. The patterns G are then put in place, with a bar, H, between the ends, to form a groove for the runner. Then the balance of the cope H' is put in place and filled up with sand, as shown in Fig. 3, a block, I, being first put in to form the sprue. The patterns G, bar H, and block I are then removed by drawing them out endwise, and the chills K or L put in place, completing the mold. For applying the chills L the boards are removed; but for applying the chills K they may either be removed or not, as preferred.

The chill L is composed of two long bars, with half of each mold formed in each, as clearly shown in Fig. 6. The chill K consists of a cylindrical block, with a groove, $a$, in the inner end, and a central stud, $k$, which enters the side of a core, $l$, which traverses the said mold and forms a transverse hole near the end of the casting, with which the axial hole formed by the stud $k$ unites. These chills make the walls of the holes for the cord very smooth, for the better protection of the cords.

We also make molds of the same character by the employment of a mold-board, M, having strips of wood or metal N attached to the upper face at regular intervals apart, to be used for holding the patterns G and bar H while the sand is packed above them, as shown in Fig. 9, the said boards E being placed at the sides, with the patterns projecting through the holes to bar H at the center and the parts H' of the flask being applied. The flask is then turned over, the mold-board M removed, and the top filled with sand. The patterns and bar H are then removed and the chills applied, as before.

Having thus described our invention, what we claim as new, and desire to secure by Letters Patent, is—

1. The nowel A, recessed plates B, plates

E, cope H', rods D, patterns G, and bar H, for forming molds for sash-weights, substantially as specified.

2. The combination, with the molds formed and arranged as above described, of the chills K or L, substantially as specified.

3. A chill for sash-weights consisting of the plug K and the core $l$, the said plug being provided with the annular groove $a$ and stud $k$, all arranged substantially as specified.

The above specification of our invention signed by us this 22d day of March, 1870.

WILLIAM FERGUSON.
    JAMES ANDERSON.

Witnesses:
 GEO. W. MAYBEE,
 ALEX. F. ROBERTS.